United States Patent [19]

Joyce

[11] Patent Number: 4,462,148

[45] Date of Patent: Jul. 31, 1984

[54] METHOD OF AXIAL RETENTION OF GEAR ON SHAFT

[75] Inventor: Arthur B. Joyce, Corinth, Miss.

[73] Assignee: Dana Corporation, Toledo, Ohio

[21] Appl. No.: 359,625

[22] Filed: Mar. 18, 1982

[51] Int. Cl.³ ............................................ B23P 11/02
[52] U.S. Cl. .................................. 29/447; 29/522 R; 403/273; 403/375
[58] Field of Search ...................... 29/447, 522 R, 509, 29/521, 159.2; 403/275, 359, 375, 380, 285, 273, 356, 358, 357

[56] References Cited

U.S. PATENT DOCUMENTS

| | | |
|---|---|---|
| 2,737,710 | 3/1956 | Noble et al. ........................... 29/447 |
| 2,899,742 | 8/1959 | Wilson ................................... 29/447 |
| 2,958,758 | 11/1960 | Snell ............................. 29/522 R X |
| 2,958,759 | 11/1960 | Snell ............................. 29/522 R X |
| 3,177,563 | 4/1965 | Pennell .............................. 29/447 X |
| 3,426,414 | 2/1969 | Dseki et al. ........................... 29/129 |
| 3,579,781 | 5/1971 | Yaegashi ......................... 29/148.4 D |
| 3,852,872 | 12/1974 | Afanador ............................... 29/447 |
| 3,961,853 | 6/1976 | Grimpe ................................. 403/273 |
| 4,172,678 | 10/1979 | Schonwald et al. ............ 403/357 X |

FOREIGN PATENT DOCUMENTS 649681 8/1937 Fed. Rep. of Germany ........ 29/447
547783 12/1922 France ................................ 29/159.2

*Primary Examiner*—Charlie T. Moon
*Attorney, Agent, or Firm*—Frank B. McDonald

[57] ABSTRACT

A method of securing a metallic gear on a metallic shaft provides an improved axial retention of the gear on the shaft in particularly severe applications, as encountered in gear pumps. The method involves plastic deformation of the annular interface regions defined at the external junctions of a gear and shaft by the application of compressive forces over same, after the gear has been secured onto the shaft by conventional methods. The preferred practice of the method first includes the steps of radially retaining the gear on the shaft via shrink fit procedures which include heating the gear, cooling the shaft, inserting the shaft into the bore of the gear, and allowing the temperatures of the gear and shaft to equalize. Upon radial retention of the gear on the shaft, the novel axial retention system of this invention preferably involves a system of hardened steel wheels, equidistantly positioned about the annular interfaces of the gear and shaft, the wheels simultaneously contacting the latter interfaces with compressive forces of magnitudes sufficient to produce plastic deformation within the aforesaid interface regions.

5 Claims, 9 Drawing Figures

METHOD OF AXIAL RETENTION OF GEAR ON SHAFT

BACKGROUND OF THE INVENTION

This invention relates to methods of securing gear members onto shaft members for use in installations such as gear pumps and similar applications which involve extreme loads. More particularly, the invention relates to methods of axial retention of gears on shafts in situations in which vibration, and shock loading is unusually severe in the axial dimension of the gear-shift system.

As is well appreciated by those skilled in this art, any cutting or removal of metal in either gear or shaft member will increase the likelihood of fatigue failure of the respective member. For this reason, a common method of joining the gear and shaft members involves making the internal diameter of the gear slightly smaller than the outside shaft diameter, and heating the gear to several hundred degrees Fahrenheit. Simultaneously, the shaft is cooled and then placed within in the bore of the gear. As the temperatures begin to equalize, the swelling of the shaft and shrinking of the gear will result in the joining of the members wherein the shaft and gear are under compression in the contact zone between them.

This particular means has been satisfactory in terms of ensuring the radial securement of the gear to the shaft, that is, in the routine torsional loading environments tending to force the gear member to rotate relative to the shaft member. However, in gear pump and other environments subjected to axial loading, axial forces on the gears will tend to shift the gears axially relative to the shafts, thus causing the shafts to move longitudinally out of the gears.

Notwithstanding the increased likelihood of fatigue failure, conventional means of axial securement of gears on shafts to withstand the latter type of extreme loading have involved keys, pins, snap rings, and other axial holding mechanisms which require cutting of the shaft or gear or both. The result has been short fatigue life expectancies of gear-shaft systems employed in such axial load environments.

SUMMARY OF THE INVENTION

A method is disclosed for enhancing the axial securement of a metallic gear on a metallic shaft, as well as promoting longer fatigue life of the gear-shaft system. The method includes the step of applying compressive forces, of a magnitude sufficient to produce plastic deformation, in the exterior annular interface regions of the gear and shaft after the gear has been previously radially secured to the shaft by conventional methods. This procedure leaves residual compressive stresses within the sub-surface of the interface regions.

A preferred practice of the method involves securing a metallic gear on a metallic shaft wherein the gear includes a bore having a diameter smaller than the diameter of the shaft. The method employs the steps of (a) heating the gear, (b) cooling the shaft, (c) inserting the shaft into the bore of the gear, and (d) allowing the temperatures of the gear and shaft to equalize. The improvement thereof, however, lies in a final step of enhancing retention of the gear longitudinally or axially on the shaft by (e) applying compressive forces of magnitudes sufficient to produce plastic deformation in the exterior annular interface regions of the gear and shaft members.

DETAILED DESCRIPTION OF A PREFERRED METHOD

Figure 1:
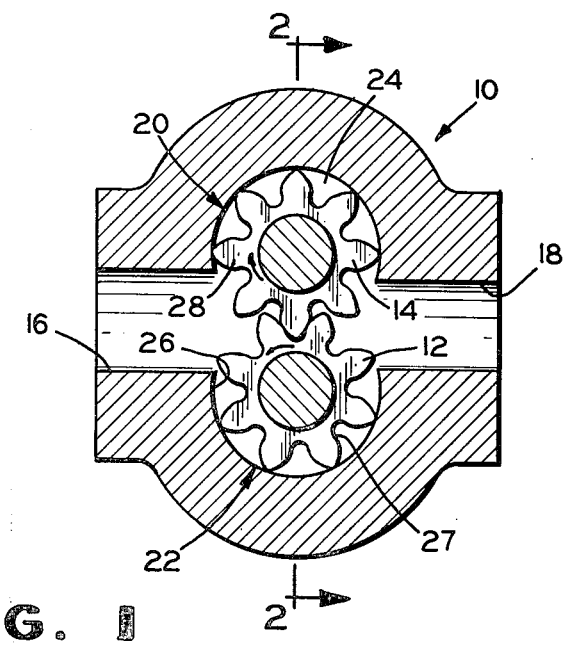
FIG. 1 is a fragmentary, sectional elevation view of a gear pump incorporating two interacting gear-shaft assemblies manufactured in accordance with this invention.

A gear pump 10, shown in FIG. 1, includes metallic drive and driven gears 12 and 14 respectively. The gears 12 and 14 remain in constant mesh, and rotate as indicated by arrows to transfer fluid from a suction port 16 to a discharge port 18. The gears 12 and 14 rotate within internal fixed lobes 20 and 22, respectively, conveying the fluid within moving pockets 24 defined by walls 26 of the lobes 20, and interstices 27 of gear teeth 28.

Figure 2:
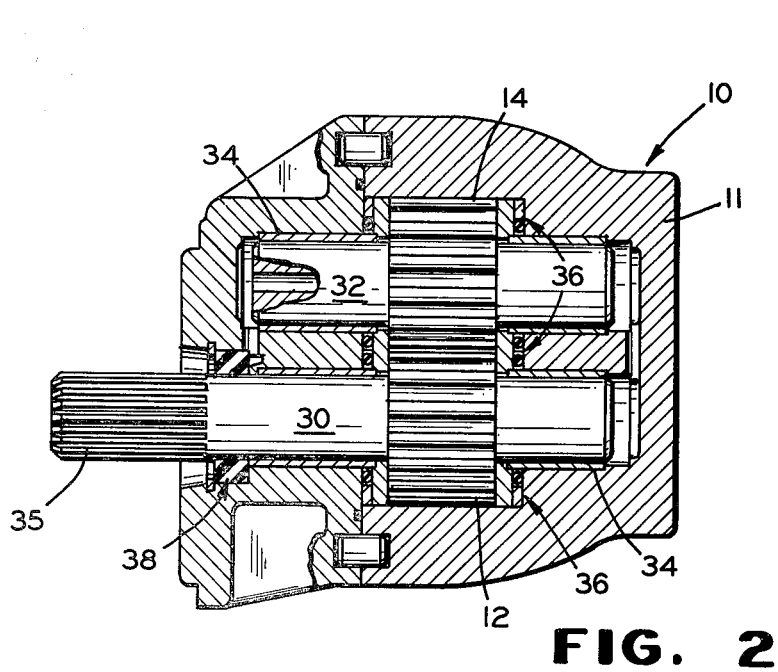
FIG. 2 is a sectional elevation of the same gear pump, shown along lines 2—2 of FIG. 1.

Referring to FIG. 2, the metallic drive and driven gears 12 and 14 are fixedly mounted on metallic drive and driven shafts 30 and 32, respectively, each shaft being rotatably supported in journal bearings 34. As apparent, the drive shaft 30 contains a splined end 35 (which alternatively may contain keys, or other coupling mechanisms) for connection with a prime mover, not shown.

A set of pressure plates 36 are urged against the sides of the gears 12 and 14 by fluid pressure ported axially inwardly thereagainst, as will be appreciated by those skilled in the art. Thus the plates 36, together with the lobe walls 26 and interstices 27 of the gear teeth 28 define the boundaries of the aforementioned moving pockets 24, which convey fluid. Seals 38 prevent leakage at the splined end 35 of the drive shaft 30. All other shaft ends are internally housed within the housing 11 of the gear pump 10.

Figure 3:
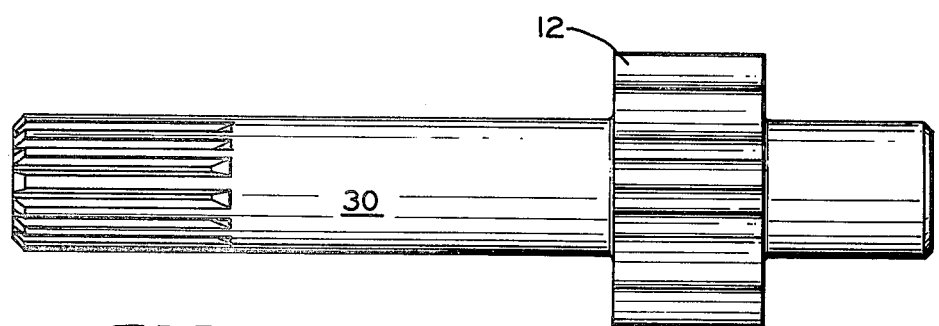
FIG. 3 is a side view of one of the two gear-shaft assemblies of the gear pump of FIG. 1.

FIG. 3 is a view of the drive shaft 30 employed in the gear pump 10 of FIGS. 1 and 2. As mentioned, the shaft 30 contains a drive gear 12 fixedly mounted thereon. A preferred method of fixing the gear 12 to the shaft 30 involves separate and distinct procedures for ensuring securement in both torsional and axial dimensions. Thus, the torsional securement procedure herein described ensures that the gear does not rotate about the shaft, while the axial securement procedure prevents the gear from shifting axially along the shaft. The latter, the axial securement procedure, is novel to gear-shaft art wherein separate gear and shaft members are involved.

A preferred securement procedure involves the steps of first torsionally securing the gear to the shaft by using gear and shaft members in which the outside diameter of the shaft is slightly oversized; that is, the external shaft diameter is larger than the internal or bore diameter of the gear. The gear is heated to several hundred degrees Fahrenheit, preferably in the range of 300–500 degrees, resulting in its expansion. Simultaneously, the shaft is cooled to at least 150–200 degrees below zero Fahrenheit. The shaft is then placed into position within the bore of the gear, and the temperatures are allowed to equalize, resulting in swelling of the shaft and shrinking of the gear. Upon completion of the process, a strong mechanical joint is formed via the residual compressive forces in the resultant members, providing a torsionally secure fixation of gear to shaft.

The improvement of this invention, however, lies in an additional procedure for the axial securement of the gear to the shaft. As mentioned, under severe axial loading on the gear, the gear can, notwithstanding a torsional securement thereof to the shaft, shift axially out of position on the shaft.

Figure 4A:
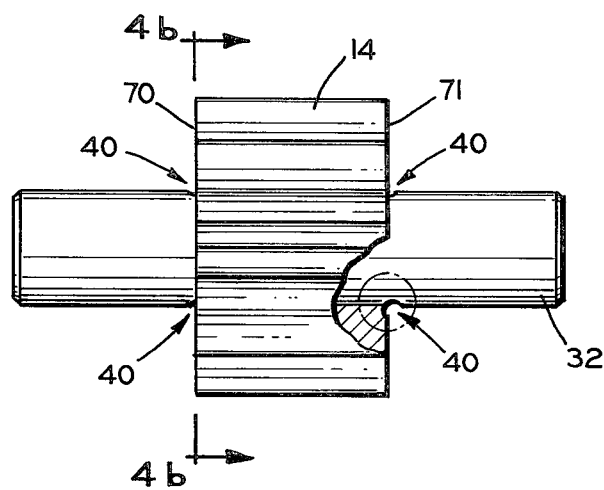
FIGS. 4a, 4b, and 4c are fragmentary sectional views of the second gear-shaft assembly, highlighting the interface region between the gear and shaft members, and particularly the zone of compressed metal in the interface region.
Figure 4B:
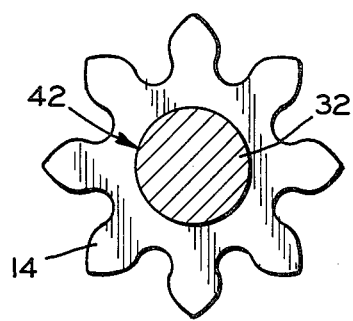
Figure 4C:
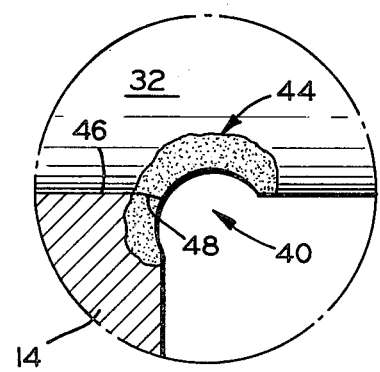

FIG. 4a is a view of the driven shaft 32, preferably a stub shaft as shown, on which a driven gear 14 is fixedly mounted as is the drive gear 12 on the shaft 30 of FIG. 3. FIG. 4c is a cut-away enlargement view of a zone 40 of the gear 14 and shaft 32 after the two have been both torsionally secured, as above-described, and axially secured, as now described.

The axial securement procedure of this invention involves the physical distortion by compression of the metal in the interface zone 40 of the gear 14 and shaft 32. The zone 40 defines an externally visible annulus 42 positioned on either side of gear 14 of FIG. 4a. FIG. 4b is a view of one of the annuli 42, taken along lines 4b—4b of FIG. 4a. Referring now specifically to FIG. 4c, it will be appreciated that the application of sufficient compressive force will result in plastic deformation of the shaft and gear structures within the interface zone 40. The shaded region 44 comprises an area in which compressive residual stresses are retained within the metal, the stresses having magnitudes preferably at least as high as 25 thousand pounds per square inch. It will further be noted that a contact junction 46 defined by the cylindrical contact area between gear bore and shaft periphery, is angularly distorted to form frustoconical shaped junction ends 48 on the contact junction 46 at the ends 70, 71 of the gear 14. The latter results in a superior axial securement mechanism.

Figure 5:
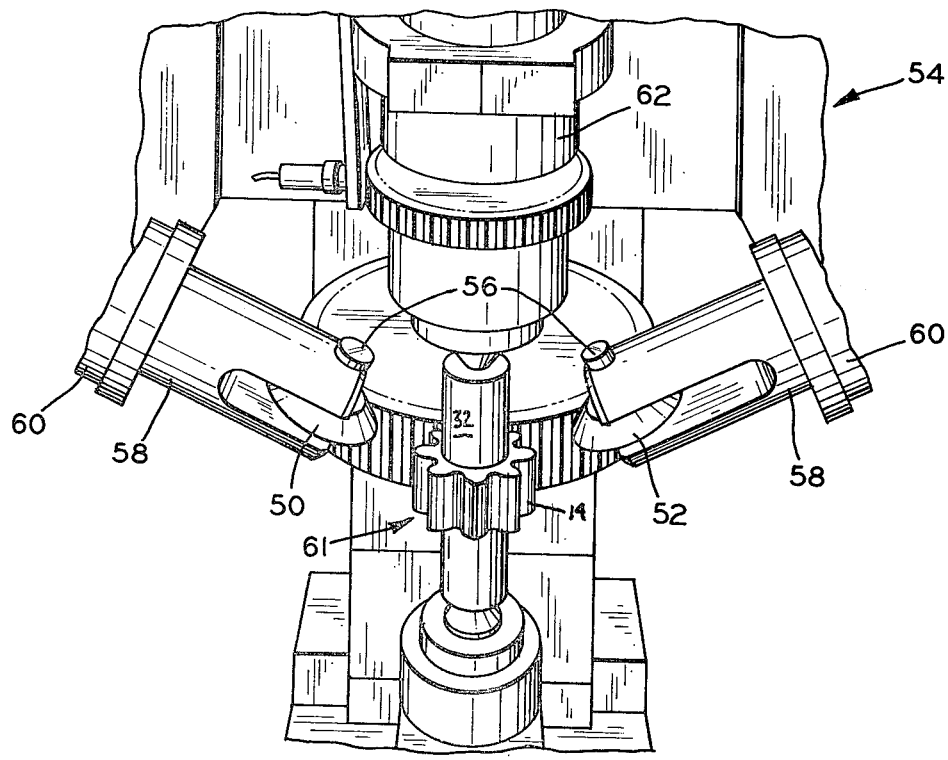
FIG. 5 is a view of apparatus utilized in a preferred practice of this invention, shown in a first position.
Figure 6:
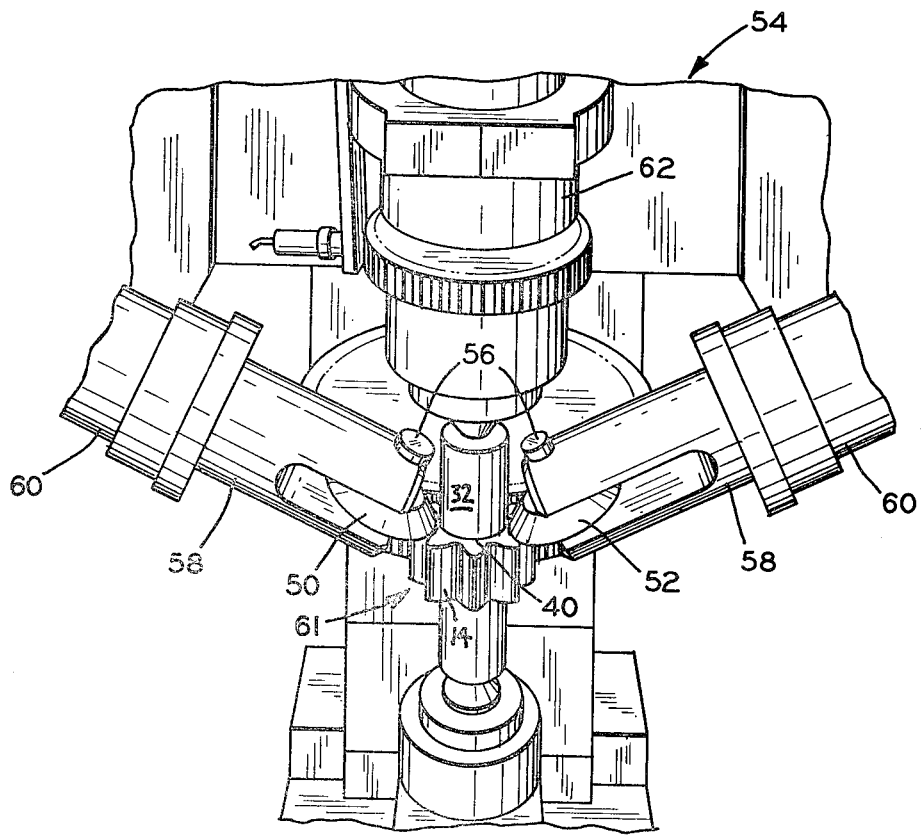
FIG. 6 is a view of same apparatus, shown in a second position.

FIGS. 5 and 6 depict preferred apparatus 54 for carrying out a preferred method of this invention. The apparatus 54 includes two diametrically opposed hardened steel wheels 50 and 52 supported on rollers 56, which in turn are fixed to piston shafts 58 extending from hydraulic cylinders 60. Shaft 30, 32, containing a gear 12, 14, hereinafter called gear assemblies 61, is rigidly supported in an arbor 62 during plastic deformation by compression of the metal in the interface zone 40. Cylinders 60 are moved apart for insertion of the gear assemblies into the arbor 62 (FIG. 5).

After insertion, the cylinders 60 are moved inwardly, whereupon the two radially opposed hardened wheels 50 and 52 are urged into contact with the upper interface zone 40 of the gear assembly 61 (See FIG. 6). The arbor is then rotated momentarily to effect several revolutions of the assembly 61, during which time the wheels 50, 52, contact the interface zone 40 at pressures of 30 thousand pounds per square inch or greater. The metal of the interface zone 40 is thereby plastically deformed, resulting in the described region 44 of residual compressive stresses (FIG. 4c). The arbor is then stopped, the hydraulic cylinders drawn apart, and the gear-shaft assembly is removed, flipped end-over-end 180 degrees and reinserted. The process is repeated on the opposite interface zone 40 to complete the axial securement procedure of this invention.

Figure 7:
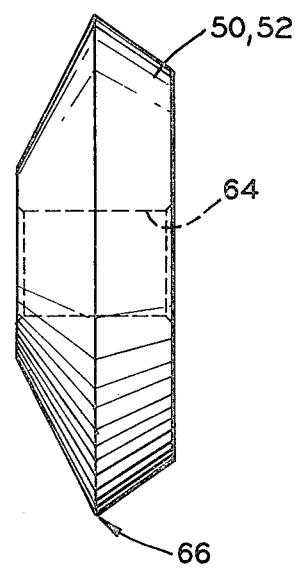
FIG. 7 is an elevation view of a compression wheel employed in the apparatus of FIGS. 5 and 6.

FIG. 7 depicts a preferred form of the wheels 50, 52 as employed to effect plastic deformation by compression in interface zones 40. The wheels are preferably fabricated of hardened steel, or alternatively may be of hard (but not brittle) non-metallic compositions, e.g. diamonds or special ceramics. The wheel includes a bore 64, by which it is supported on a roller 56, as shown in FIGS. 5 and 6. In a preferred form, the contact or working edge 66 of the wheel has a radius in the range of 15 to 25 thousandths of an inch to provide a concave surface in the interface zone 40.

Referring back to FIG. 4c, it may now be appreciated that the greater amount of the compression region 44 extends into the shaft than the gear surface. Thus, as shown, the shaft has undergone more plastic deformation than the gear. This is of course controlled by the position of the working edge 66 relative to the interface zone 40. Preferably, the wheels 50, 52 lie in planes which intersect the longitudinal axis of the shaft at an angle greater than forty-five degrees. Normally, the previously mentioned frustoconical shaped junction ends 48, as formed by the distortion of the contact junction 46 will flare away from the member undergoing the greater amount of compressive deformation; thus the junction ends 48 are in the embodiment shown angled toward the gear, or outwardly of the shaft. Alternatively, the gear may receive a greater amount of compressive deformation, and the junction ends 48 of the contact junction 46 will then flare inwardly toward the shaft.

It is believed that the effectiveness of this novel procedure depends at least in part upon the achievement of the flared or distorted ends 48, and that if both members were equally compressed, the axial securement mechanism would not be as effective. This is because the distorted ends 48 result in annular mechanical locks, formed by the metal of one member slightly displacing the metal of the other via the compression forces imposed thereon.

The aforedescribed apparatus and procedure are but one combination of numerous alternatives envisioned under the novel method of this invention, and as covered in the following claims. For example, in addition to gears, this invention is amenable to other annular members supported on a shaft such as fixed rollers, cams, and the like.

What is claimed is:

1. In a metallic gear torsionally and axially secured to a metallic shaft, the gear including a bore having a diameter smaller than the diameter of said shaft, through which the shaft extends, and defining external annular interface regions at the junction of gear and shaft members, an improved method of axially securing said gear to said shaft comprising the steps of (a) heating the gear, (b) cooling the shaft, (c) inserting the cooled shaft into the bore of the heated gear, (d) allowing the temperatures of the gear and shaft to equalize and (e) then applying compressive forces to the metal at said regions, said forces being of magnitudes sufficient to produce plastic deformation of the metal of said gear and shaft within said interface region, wherein said compressive forces are applied by a wheel moved relatively about said interfaces of said gear and shaft.

2. The method of claim 1 wherein said compressive forces are equal to or greater than twenty thousand pounds per square inch.

3. The method of claim 2 wherein said wheel comprises a contact edge having a radius of at least 15 thousandths of an inch.

4. The method of claim 3 wherein at least two of said wheels are employed, said wheels positioned equidistantly about said external annular interfaces of said gear and shaft.

5. The method of claim 4 wherein said wheels lie in planes which intersect the longitudinal axis of said shaft at an angle greater than forty-five degrees, whereby one of said gear and shaft is plastically deformed more than the other.

* * * * *